No. 728,233. Patented May 19, 1903.

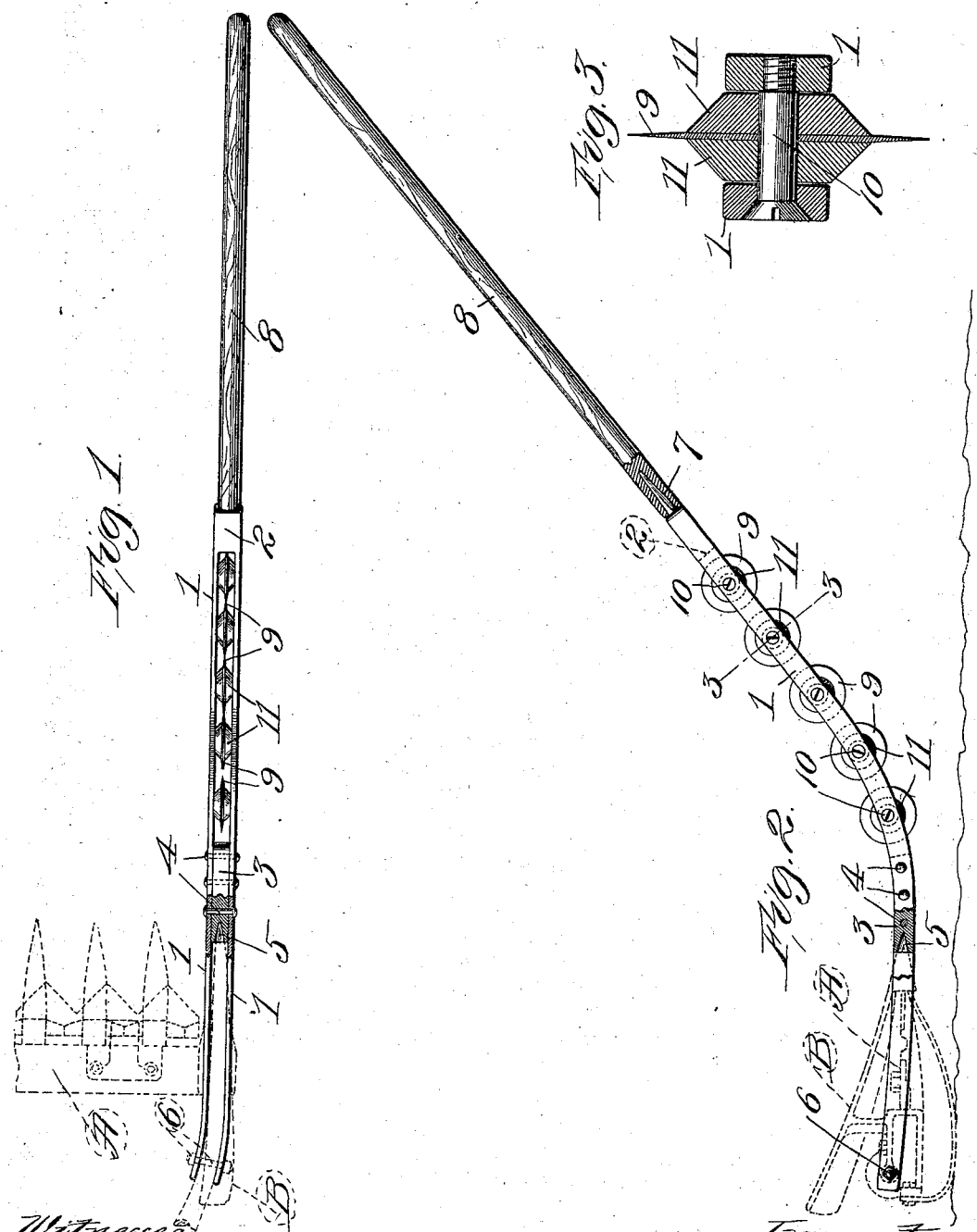

UNITED STATES PATENT OFFICE.

WILLIS HORD, OF JENNINGS, MISSOURI.

ATTACHMENT FOR MOWING-MACHINES.

SPECIFICATION forming part of Letters Patent No. 728,233, dated May 19, 1903.

Application filed September 8, 1902. Serial No. 122,553. (No model.)

*To all whom it may concern:*

Be it known that I, WILLIS HORD, a citizen of the United States, residing at Jennings, St. Louis county, State of Missouri, have invented a certain new and useful Improvement in Attachments for Mowing-Machines, of which the following is a full, clear, and exact description, such as will enable others skilled in the art to which it appertains to make and use the same, reference being had to the accompanying drawings, forming part of this specification, in which—

Figure 1 is a top plan view, partly in section, the present attachment being shown in full lines and a portion of a mowing-machine being shown in dotted lines. Fig. 2 is a side elevation, partly in section, the present attachment being shown in full lines and a portion of a mowing-machine being shown in dotted lines; and Fig. 3 is a sectional view on the line 3 3 of Fig. 2.

My invention relates to attachments for mowing-machines and the like, and more particularly to attachments by means of which a line of demarcation is produced between the last swath and the unmowed portion of the field.

As is well known, when mowing cow-pea, clover-hay, and other tangled growth it is very difficult to distinguish the mowed from the unmowed material, and in order to produce a mark between the swath last cut and the unmowed portion of the field it has been proposed to cut the vines vertically at the outer edge of the swath and to press these vines down.

My object is to provide a convenient attachment for accomplishing the above-mentioned purpose, the attachment being cheap and easily constructed, being readily attached to any mowing-machine, and being provided with cutters so supported that the vines are readily cut, the attachment offering no undue obstruction to the forward movement of the machine.

To these ends and also to improve generally upon devices of the character indicated my invention consists in the various matters hereinafter described and claimed.

Referring now more particularly to the drawings, A indicates the finger-bar of a mowing-machine, and B represents the shoe upon the outer end of said finger-bar, said parts being constructed in any appropriate manner. Side plates 1 are spaced apart and connected at their forward end by being welded or otherwise secured to a suitable head 2, said plates having intermediate their ends a spacing or distance piece 3, upon which the plates are secured, as by means of bolts 4. The inner ends of the side plates receive the shoe B or some other appropriate portion of the mowing-machine between them, the pointed forward end of the shoe being received in a socket 5 in the rear end of the distance-piece 3, and a bolt 6, passing through the side plates at their rear ends and also through the shoe or some other portion of the mowing-machine, holds the attachment firmly in position. The side plates extend forwardly to a point slightly in advance of the forward end of the shoe and then incline forwardly and upwardly. The forward end of the head 2 is preferably provided with a tapering finger or other appropriate connecting member 7, upon which a suitable wooden rod 8 is adapted to be secured, this rod being conveniently a hoe-handle, rake-handle, or the like, so that should the rod be broken a substitute for the same can be readily procured and placed in position. The connected side plates and said rod form an upwardly and forwardly extending presser-bar.

In the portion of this presser-bar between the head 2 and the distance-piece 3 a plurality of rotatable cutters 9 are journaled, these cutters being conveniently mounted upon threaded bolts 10, which extend through and connect the side plates, and distance-pieces 11 are supported upon said bolts 10 at the sides of the cutting-disks 9 and intermediate said disks and the side plates. The lowermost and rearmost cutting-disk is a short distance above the ground, and the other cutting-disks lie in a forwardly and upwardly extending line from the said lowermost cutting-disk. Thus as the machine travels forwardly the vines and the like are engaged by the presser-bar and directed to the cutting-disks, the disks cutting these vines as the machine is drawn along and the cut portions being forced downwardly by the inclined presser-bar. As will be apparent, the disks are so arranged that the vines do not clog between said disks or presser-bar and ground, and therefore the forward action of the machine is not unduly obstructed.

The attachment is inexpensive and can be easily manufactured. The distance-piece 3 can be readily placed in position, the cutting-disks can be easily inserted or removed, and the attachment can be secured to the machine without difficulty. Furthermore, the entire presser-bar is not constructed of metal, and its cost is therefore greatly cheapened, the forward portion of said presser-bar being of wood and this wooden portion being conveniently the handle of a rake or similar device.

I am aware that minor changes in the construction, arrangement, and combination of the several parts of my attachment can be made and substituted for those herein shown and described without in the least departing from the nature and principle of my invention.

Having thus described my invention, what I claim, and desire to secure by Letters Patent, is—

1. In a device adapted to cut vines and the like vertically at the outer edge of a swath, the combination with a finger-bar of a mowing-machine or the like, of a curved presser-bar adapted to contact with the material to be cut, and a plurality of coöperating cutters carried thereby; substantially as described.

2. The combination with the finger-bar of a mowing-machine, of a presser-bar connected thereto and extending upwardly and forwardly therefrom, and a plurality of rotatable cutting-disks supported upon said bar; substantially as described.

3. In a device adapted to cut vines and the like vertically at the outer edge of a swath, above the ground, the combination with a mowing-machine, of an attachment of the character indicated, said attachment including a presser-bar having side plates which receive an appropriate part of the mowing-machine between them and are secured to said part, and a plurality of cutting-disks journaled between said side plates; substantially as described.

4. In a device adapted to cut vines and the like vertically at the outer edge of a swath, above the ground, the side plates, a head connecting said plates at one end, a distance-block between said plates intermediate their ends, and a plurality of cutting-disks journaled between said plates intermediate said head and said distance-block; substantially as described.

5. In a device adapted to cut vines and the like vertically at the outer edge of a swath, above the ground, the side plates, a head connecting said plates at one end, a distance-block between said plates and intermediate their ends, the rear face of said block being provided with a socket adapted to receive the shoe of a mowing-machine, and a plurality of cutting-disks journaled between said plates intermediate said head and said distance-block; substantially as described.

In testimony whereof I hereunto affix my signature, in the presence of two witnesses, this 6th day of September, 1902.

WILLIS HORD.

Witnesses:
GALES P. MOORE,
GEORGE BAKEWELL.